(12) United States Patent
Geissels et al.

(10) Patent No.: US 6,343,447 B2
(45) Date of Patent: Feb. 5, 2002

(54) FACADE SYSTEM WITH A TRANSLUCENT POROUS INSULATING MATERIAL

(75) Inventors: Alexander Geissels; Franz-Josef Kaspar; Jürgen Royar, all of Ladenburg; Joachim Schlogl, Mannheim, all of (DE)

(73) Assignee: Isover Saint-Gobain, Courbevoie (FR)

( * ) Notice: Subject to any disclaimer, the term of this patent is extended or adjusted under 35 U.S.C. 154(b) by 0 days.

(21) Appl. No.: 09/333,257

(22) Filed: Jun. 15, 1999

Related U.S. Application Data

(63) Continuation of application No. PCT/EP98/06696, filed on Oct. 21, 1998.

(30) Foreign Application Priority Data

Oct. 21, 1997 (DE) ......................................... 197 46 429
Oct. 21, 1997 (DE) ..................................... 297 18 676 U

(51) Int. Cl.$^7$ ................................................. E04D 3/06
(52) U.S. Cl. ...................... 52/173.3; 52/311.1; 52/235; 52/535; 52/540
(58) Field of Search ............................... 52/311.1, 235, 52/535, 540; 428/1.51, 578, 582, 339, 354

(56) References Cited

U.S. PATENT DOCUMENTS

| | | | | |
|---|---|---|---|---|
| 3,183,996 A | * | 5/1965 | Capaul | 52/235 |
| 3,583,522 A | * | 6/1971 | Rohweder | 181/33 |
| 4,706,435 A | * | 11/1987 | Stewart | 52/533 |
| 4,724,638 A | * | 2/1988 | Bezborodko | 52/311 |
| 5,092,101 A | * | 3/1992 | Kunert | 52/789 |
| 5,205,884 A | * | 4/1993 | Rauscher | 156/63 |
| 5,493,826 A | * | 2/1996 | Keller et al. | 52/204.59 |
| 5,733,624 A | * | 3/1998 | Syme et al. | 428/68 |
| 5,757,564 A | * | 5/1998 | Cross et al. | 359/870 |
| 5,783,264 A | * | 7/1998 | Howes | 428/13 |
| 5,843,546 A | * | 12/1998 | Eichhorn | 428/38 |

FOREIGN PATENT DOCUMENTS

| | | |
|---|---|---|
| DE | 297 18 676 | 1/1998 |
| EP | 0 123 091 | 10/1984 |
| EP | 0 243 912 | 11/1987 |
| GB | 1 571 599 | 7/1980 |
| WO | 88/08906 | 11/1988 |

\* cited by examiner

Primary Examiner—Carl D. Friedman
Assistant Examiner—Phi Dieu Trana
(74) Attorney, Agent, or Firm—Pillsbury Winthrop LLP

(57) ABSTRACT

A facade system with a translucent porous insulating material of mineral or organic fibers for passive solar energy utilization is provided. The insulating material has on the outside a colored layer for design purposes and for controlling the light transmittance. The facade system is formed from a multiplicity of preferably factory-prefabricated facade insulating boards. The colored layer can, moreover, be designed in such a way that it protrudes beyond the insulating layer along two board edges. Consequently, when the facade insulating boards are applied to the building wall, the abutting edges in the region of the joins between neighboring insulating boards are covered by the overlapping protruding colored layer.

13 Claims, 3 Drawing Sheets

FACADE SYSTEM WITH ATRANSLUCENT POROUS INSULATING MATERIAL

This is a Continuation of International Appln. No. PCT/EP98/06696 filed Oct. 21, 1998.

BACKGROUND OF THE INVENTION

1. Field of the Invention

The present invention relates to a facade system with a translucent porous insulating material of mineral or organic fibers; the insulating material having on the outside a colored layer for controlling light transmittance and improving appearance.

2. Description of the Related Art

A generically determinative facade system is known from EP 0 362 242. This known facade surfacing has an insulating layer of heat-insulating material with light-admitting weatherproofing provided on the outside in the form of a transparent outer covering, produced for example from silicate glass or synthetic glass. The insulating layer, which may be produced, for example, from a multiplicity of factory-prefabricated glass-fiber or mineral-fiber insulating boards which are fastened on the outer wall of the building adjacently in a surface-covering manner, is designed in such a way that a temperature profile can be adjusted, when there is usable solar irradiation, with a maximum value within the insulating layer. For this purpose, the insulating layer can be designed to be opaque or translucent between its outer and inner bounding surfaces, with a transmittance $\tau$ of less than 10% and an absorbance a of more than 15%.

The innovative facade surfacing has proved to be entirely serviceable, but has the disadvantage that, with the outer covering with which it is provided, designed as a transparent layer and made, for example, of silicate glass, synthetic glass or weatherproof sheetings, it is not possible to achieve building facades which are visually and/or aesthetically pleasing for the house owner or viewer. This is true because in the case of such a configuration of the known facade system the outer or viewer-side surface of the insulating layer, which lies behind the transparent weatherproofing layer or outer covering and the surface structure can be clearly seen. This does not lend a building facade with a pleasing exterior appearance. Although it has already been proposed in EP 0 362 242 to tint the outer covering by coloring the panels forming it, this is very costly and is not possible in any desired color. Alternatively, it has been proposed in EP 0 362 242 to color or pattern the outer surface of the insulating layer or provide it with motifs. Quite apart from the fact that this proposal has not proved to be feasible in practice, coloring the outer insulating layer does not in any way have the effect of lending its surface a different appearance than that which is predetermined by the structure or position of the fibers forming the insulating layer. As already stated above, the latter is, however, not satisfactory from a visual and/or aesthetic viewpoint.

A further problem is the appearance of the region where the insulating boards are joined. Here there is the great risk that, in particular, with a dark outer surface of the insulating layer, if the insulating boards are not laid in line or accurately, the mineral wool lying behind, which for example is lighter, becomes visible and can be seen as a light line. This additionally has an adverse effect on the overall appearance of the facade.

This gives rise to the object of the present invention of further developing the generic facade system in such a way that an appearance which is visually and/or aesthetically satisfactory or pleasing to the viewer can be produced.

SUMMARY OF THE INVENTION

This object is achieved by the present invention, which provides a facade system with a translucent porous insulating material of mineral or organic fibers for passive solar energy utilization, wherein the insulating material has on the outside a colored layer (2,2') for controlling the light transmittance $\tau$ and improving the appearance.

The fact that the insulating material or the insulating layer of the facade system according to the invention is for the first time provided with a colored layer on the outside allows the unsightly surface structure of the insulating layer to be replaced by a visually and/or aesthetically pleasing surface structure which, moreover, can be provided with any desired tinting. This advantageously makes it possible, in addition, to use this externally applied colored layer for design purposes in any form and at the same time specifically control the light transmittance $\tau$ with this colored layer.

Another embodiment of the present invention provides a facade system whereby controlling of the light transmittance $\tau$ can take place by means of a different color graduation of the colored layer. Consequently, allowance can be advantageously made for different angles of incident light radiation and radiation intensities by appropriate tinting. This makes it possible for the first time to control the light transmittance $\tau$ by increased light reflection or light absorption a.

The light reflection or absorption of the colored layer can be advantageously controlled by a suitable pigmentation of the respectively chosen color or by the incorporation of metal particles in the colored layer. This opens up a wide range of possible variations with regard to the surface design of the colored layer, the choice of color and color intensity and also the controlling of the light transmittance $\tau$ in every respect.

A particularly low-cost alternative embodiment is the laminating of a colored glass-fiber felt onto the insulating material in order to apply the colored layer according to the invention. The colored layer or the colored glass-fiber felt may, for example, be adhesively attached to the insulating layer or be applied in some other way. In the case of adhesive attachment, a foam adhesive which has been specially developed for this purpose has proven to be particularly advantageous. This foam adhesive is described in German Patent Application DE 197 46 442.4 by the same applicant, the complete disclosure of which is fully incorporated herein by reference. This special foam adhesive does not show through the felt to be adhesively attached when it is applied. This is in contrast to the possibility that a conventional full-surface adhesive may show through the felt and, as a result, spoil the uniform coloration or color appearance.

It is at the same time also an advantage of the present invention that the colored layer can for the first time be of a color-fast design with respect to UV irradiation. What is more, in the case of a further embodiment, a clear cost reduction is evident if a glass panel, in particular a commercially available glass panel, is provided as the transparent weatherproofing or transparent outer covering, since tinted types of glass are more expensive than clear types of glass. For the visual and/or aesthetic design of the facade to be further optimized, there may additionally be the case in the facade system according to the invention that the glass panel itself is provided with a pattern, in particular with a grid-shaped or symbolic pattern.

The fact that the light transmittance τ is for the first type controlled by means of the colored layer makes it possible to ensure in an aesthetically pleasing way that in the summer there is no overheating of the building wall adjoining the facade system. This takes place in a particularly advantageous way by the insulating layer with the colored layer being designed such that a temperature profile can be achieved, when there is usable solar irradiation, with a maximum value within the insulating layer, a light transmittance τ of less than 10% being set between its outer and inner bounding surfaces.

The facade system can be constructed in a quick and efficient way, by applying the insulating layer and the colored layer together in the form of factory-prefabricated facade insulating boards. When doing so, the colored layer preferably protrudes beyond the insulating layer along two board edges.

In a particularly advantageous embodiment, the colored layer is designed in such a way that, for example along two angularly neighboring board edges, it protrudes beyond the latter. Consequently, when the facade insulating boards are applied to the building wall, the abutting edges in the region of the joins between neighboring insulating boards are covered by the overlapping protruding colored layer. Consequently, the occurrence of differently colored or light lines is eliminated and the overall appearance of the facade is not adversely affected if, for example, the joins of the facade insulating boards are not in line, since the joins between the insulating boards are covered by the overlap and are consequently not visible. A facade with the appearance of uniformity of the desired color is the result.

In a further advantageous embodiment, the colored layer is applied to the prefabricated facade insulating board in such a way that, similar to the lamination of an edge strip mat, the colored layer protrudes parallel to and along two opposite board edges beyond the latter. Consequently, abutting edges in the region of the join between neighbouring insulating boards are likewise covered by the overlapping protruding colored layer, which presupposes, however, that the individual facade insulating board is of a square design and, when being applied to the building wall can be turned alternately through 90°, so that, in a way analogous to the imbricated overlapping explained above, complete coverage of all the joins is likewise achieved. What is more, a square form with parallel projections makes it possible for the facade insulating boards to be produced at low cost, since, starting with an initially endless mineral wool web, the latter can be continuously laminated with the colored felt directly on the line and subsequently divided into the finished facade insulating boards.

A further advantage is that, in the case of the facade insulating board according to the invention, with a transparent or translucent colored layer for improving the visual appearance of the joins, it is not required for a felt strip to be stuck over the joins at the site.

DESCRIPTION OF THE PREFERRED EMBODIMENTS

The invention is explained in more detail below on the basis of two exemplary embodiments with reference to the figures.

Figure 1:
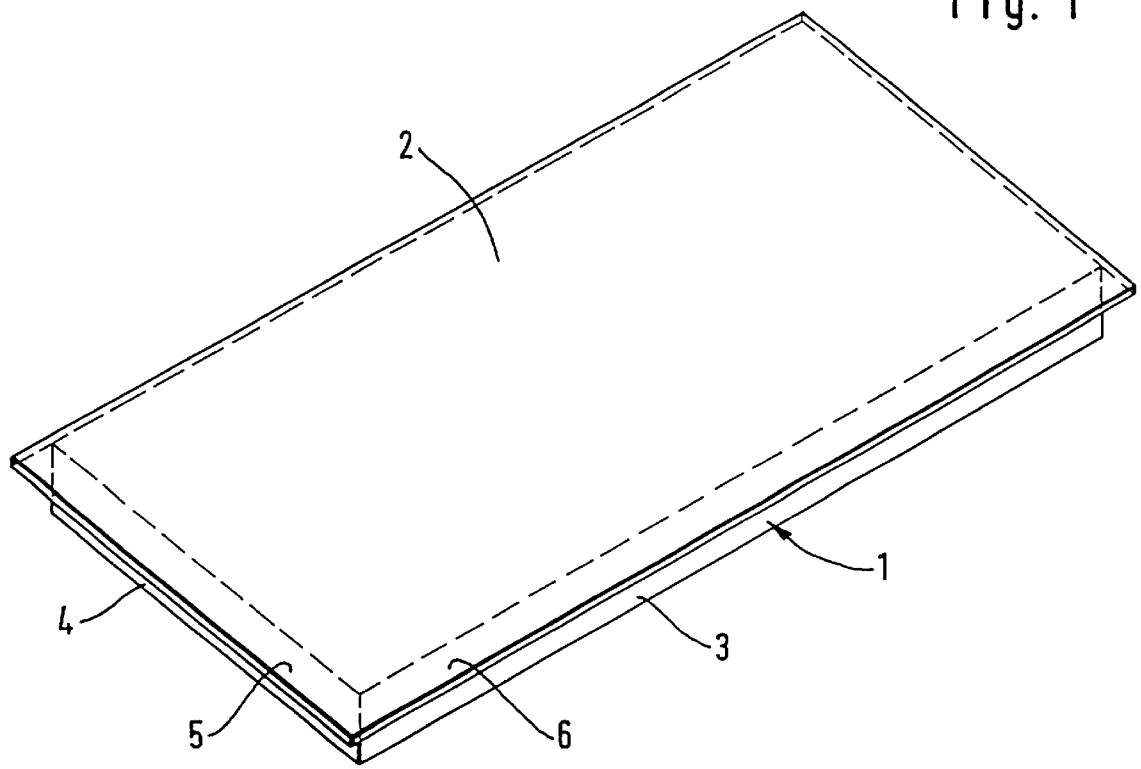
FIG. 1 shows a perspective view of a first, rectangular embodiment of a facade insulating board according to the invention.

FIG. 1 is a perspective view showing a rectangular facade insulating board 1, which is laminated with a colored felt 2. The felt 2 protrudes along two angularly neighbouring board edges 3 and 4 beyond the latter, to be precise denoted by 5 and 6.

Figure 2:
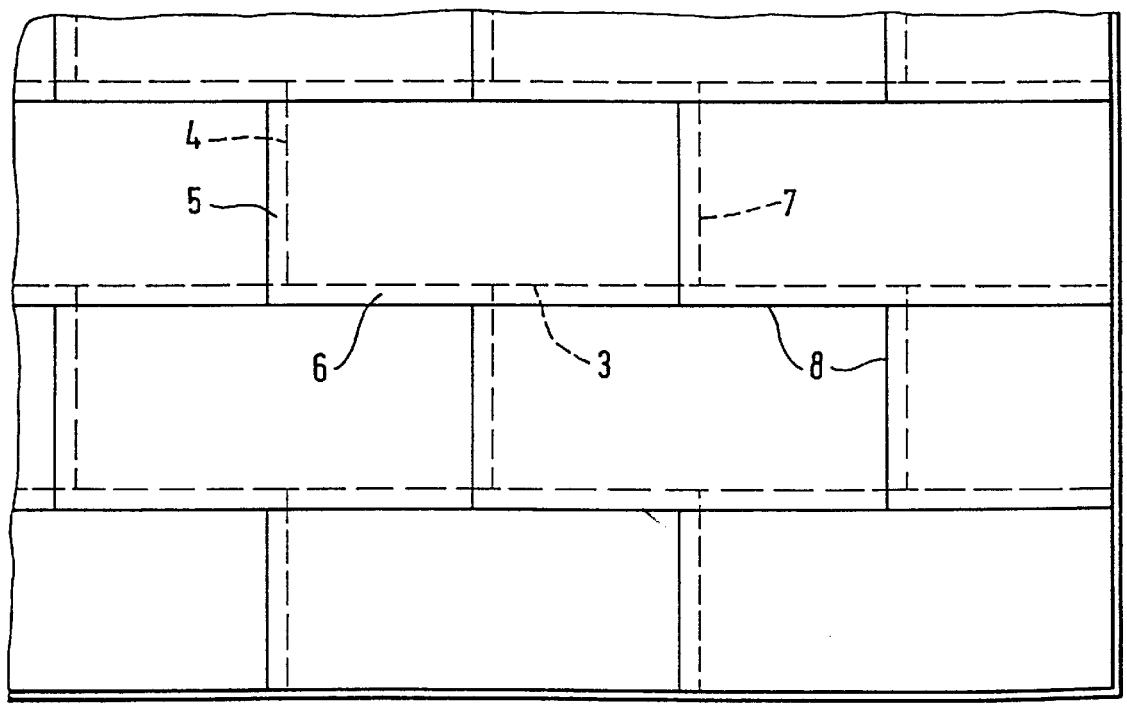
FIG. 2 shows a plan view of a detail of a facade insulated with the facade insulating boards shown in FIG. 1.

FIG. 2 is a plan view showing a detail of a facade insulated with the facade insulating boards 1, in which the insulating boards 1 are arranged adjacently with their joins offset, the joins of the insulating boards 1 are represented by dashed lines and are denoted by 7. The visible felt limitations are denoted by 8. The respective projections 5, 6 of the colored felt 2 thereby form an imbricated overlap similar to a slate-covered roof.

Figure 3:
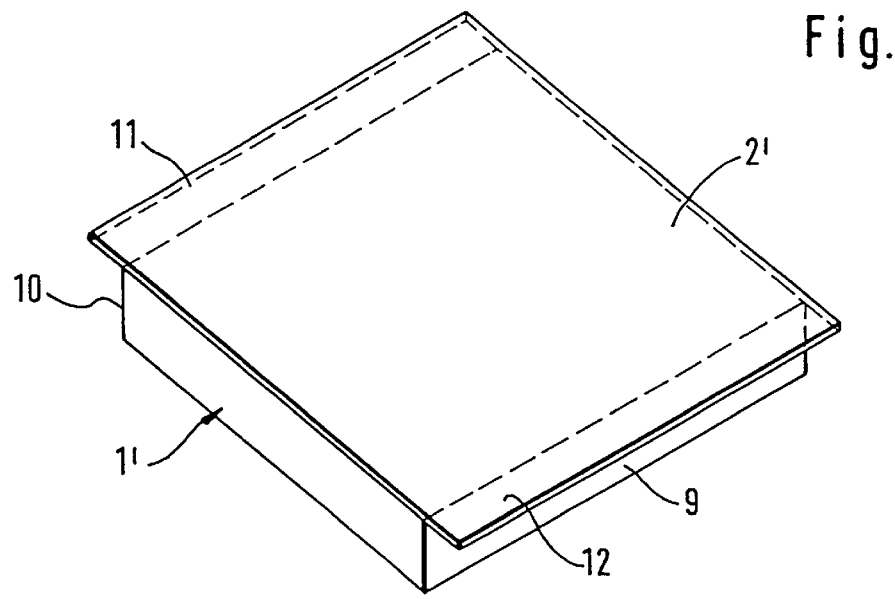
FIG. 3 shows a perspective view of a second, square embodiment of a facade insulating board according to the invention.

FIG. 3 is a perspective view showing a square facade insulating board 1', which is laminated with a colored felt 2'. The felt 2' protrudes along two parallel opposite board edges 9 and 10 beyond the latter, to be precise denoted as projections 11 and 12.

Figure 4:
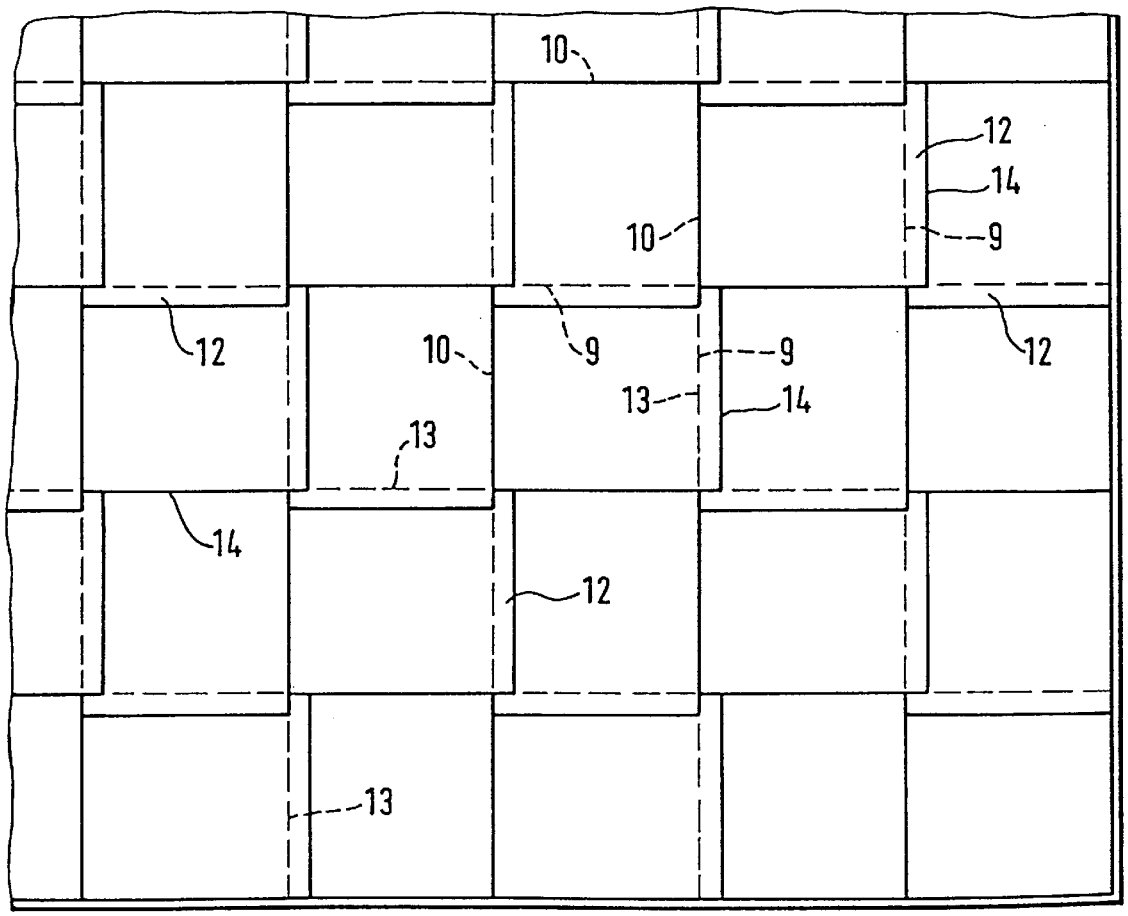
FIG. 4 shows a plan view of a detail of a facade insulated with the facade insulating boards shown in FIG. 3.

FIG. 4, is the plan view showing a detail of a facade insulated with the facade insulating boards 1', in which the square insulating boards 1' are arranged adjacently and alternately turned through 90°, the joins between the insulating boards 1' are represented by dashed lines and are denoted by 13. The felt limitations denoted by 14 cannot, however, be seen as such in the overall appearance of the facade, which instead appears as a uniform colored surface on account of the respective overlaps of the colored felt.

Figure 5:
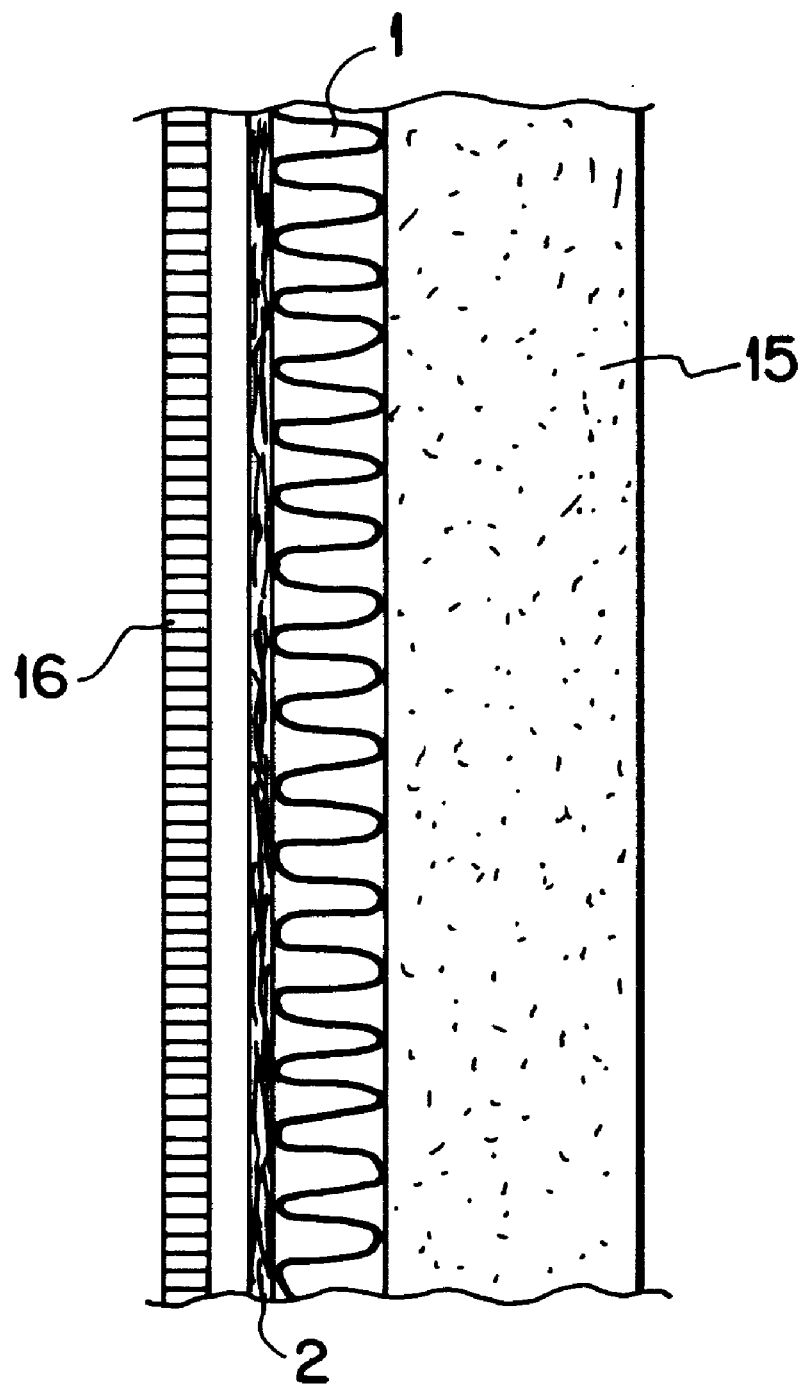
FIG. 5 shows a crosssectional side view of a facade insulating board on a building wall.

As shown in FIG. 5, a facade system of a building's wall 15 includes a porous insulating material of mineral or organic fibers 1 for passive solar energy utilization and a transparent glass cover or on transparent weatherproofing 16 for protection against atmospheric influences in the form of an external cover provided on its outer side. Between the transparent waterproofing 16 and the porous insulating material 1 is arranged a separate colored layer 2 wherein the porous insulating material 1 has bonded to the outside the separate colored layer 2 for design purposes and or controlling the light transmittance τ.

The results of a test investigating the facade insulating boards 1 and 1' according to the invention from their physical aspects relating to construction are also presented below. The test served for determining characteristic optical and radiation-physical variables according to DIN 67507, June 1980 edition, and in particular for determining the radiant absorbance. Used as samples were five specimens with a mineral wool thickness of about 4 mm and a sample size of $5*5$ cm² for a measuring area of $1*1$ cm². The specimens differed in the colors of the sample outer surfaces, which were red (RAL 3002), blue (RAL 5019), green (RAL 6016), yellow (RAL 1021) and grey (RAL 7035).

The radiant transmittance $\tau_e$, the radiant reflectance p. and the radiant absorbance $a_e = \tau_e - \rho_e$ of the test material were calculated from spectral measurements in the wavelength range from 280 nm to 2500 nm and the spectral energy distribution for perpendicularly incident global radiation. The transmitted or reflected radiation was spatially integrated here in the spectral measurement ("Ulbricht sphere"). Furthermore, the radiant absorbance is given only as an overall value, i.e. the local distribution of the absorption over the cross-section of the sample has not been determined. The test produced the following results:

| Sample | Radiant transmittance | Radiant reflectance p, | Radiant absorbance a, |
|---|---|---|---|
| red (RAL 3002) | 0.06 | 0.48 | 0.46 |
| blue (RAL 5019) | 0.04 | 0.18 | 0.78 |
| green (RAL 6016) | 0.05 | 0.30 | 0.65 |
| Yellow (RAL 1021) | 0.07 | 0.49 | 0.44 |
| grey (RAL 7035) | 0.05 | 0.45 | 0.50 |

These measurement results are given by way of example for an embodiment of the invention. As already explained at length above, the radiant transmittance can be specifically controlled by the type and structure of the colored layer 2 or 2', for instance a transition from blue to yellow approximately doubling the transmittance $\tau_e$, far more than doubling the reflectance $\rho_e$ and approximately halving the absorbance $a_e$. Therefore, a variety of changes modifications are possible without leaving the scope of the invention.

What we claim is:

1. A facade system comprising;

a porous insulating material of mineral or organic fibers for passive solar energy utilization, wherein the insulating material has bonded to the outside a separate porous colored layer for design purposes and for controlling the light transmittance τ, said colored layer being formed by a colored glass-fiber felt which is laminated on the insulating layer and wherein said system further comprises transparent weatherproofing.

2. The facade system according to claim 1, wherein said colored layer comprises different color graduations.

3. The facade system according to claim 1 or 2, wherein the control of light transmittance τ takes place by increased light reflection.

4. The facade system according to claim 3, wherein said colored layer comprise a pigmentation selected to control light reflection.

5. The facade system according to claim 1, wherein the colored layer is of a color-fast design with respect to UV irradiation.

6. The facade system according to claim 1, wherein the transparent weatherproofing is provided with a grid-shaped pattern.

7. The facade system according to claim 1, wherein in summer there is no overheating of the building wall adjoining the facade system.

8. The facade system according to claim 1, wherein said facade system has a light transmittance τ of less than 10%.

9. The facade system according to claim 1, wherein the insulating layer with the colored layer is designed as a facade insulating board in which the colored layer protrudes beyond the insulating layer along two board edges.

10. The facade system according to claim 9, wherein the facade insulating board is square and the colored layer protrudes along two opposite board edges.

11. The facade system according to claim 9, wherein the colored layer protrudes along two angularly neighboring board edges.

12. The facade system according to claim 1, wherein metal particles are incorporated in the colored layer.

13. The facade system according to claim 1, wherein said transparent waterproofing comprises a glass panel.

* * * * *